US010951460B1

(12) United States Patent
Dondemadhahalli et al.

(10) Patent No.: US 10,951,460 B1
(45) Date of Patent: Mar. 16, 2021

(54) CLOUD COMPUTING PLATFORM SERVICE MANAGEMENT

(71) Applicant: EMC IP Holding Company LLC, Hopkinton, MA (US)

(72) Inventors: Narasimha M. Dondemadhahalli, Shrewsbury, MA (US); Ramakanth Muthyala, South Grafton, MA (US); Julie A. Dougherty, Natick, MA (US); Rajanikanth R. Markala, Shrewsbury, MA (US); Som Nath Upadhyay, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 53 days.

(21) Appl. No.: 15/882,359

(22) Filed: Jan. 29, 2018

(51) Int. Cl.
G06F 8/38 (2018.01)
H04L 12/24 (2006.01)
(Continued)

(52) U.S. Cl.
CPC ............ H04L 41/0246 (2013.01); G06F 8/38 (2013.01); H04L 63/10 (2013.01); H04L 67/10 (2013.01)

(58) Field of Classification Search
CPC ..... H04L 67/16; H04L 41/0803; H04L 41/20; H04L 47/70; H04L 67/2838; H04L 41/0893; H04L 41/5064; H04L 63/10; H04L 47/781; H04L 41/5041; H04L 67/10; H04L 43/045; H04L 43/14; H04L 67/125; H04L 41/22; G06F 8/71; G06F 11/3604; G06F 9/44; G06F 11/362; G06F 11/3664; G06F 8/20; G06F 8/38; G06F 11/3668; G06F 8/658; G06F 8/72; G06F 8/60; G06F 21/41; G06F 8/70; G06F 11/3688; G06F 2201/815; G06F 8/30; G06F 8/34; G06F 8/65; G06F 8/76; G06F 9/5022; G06F 21/56; G06F 2201/865; G06F 9/468; G06F 9/5088; H04W 84/12; H04W 4/00; H04W 4/021; H04W 4/70; H04W 72/0406; H04W 72/10; H04W 12/0023; H04W 12/00505;
(Continued)

(56) References Cited

U.S. PATENT DOCUMENTS

2009/0265430 A1* 10/2009 Bechtel ............... H04L 12/1813
709/205
2011/0153727 A1* 6/2011 Li ........................... G06F 21/41
709/203
(Continued)

Primary Examiner — Backhean Tiv
Assistant Examiner — Linh T. Nguyen
(74) Attorney, Agent, or Firm — Ryan, Mason & Lewis, LLP

(57) ABSTRACT

Techniques are provided for improved management of cloud computing platform services in cloud computing environments. For example, a system comprises one or more processors operatively coupled to one or more memories to form a cloud computing platform services management framework, wherein the cloud computing platform services management framework is configured to perform steps of: providing one or more graphical user interfaces; and enabling centralized self-service access to a plurality of cloud computing platform services through the one or more graphical user interfaces for one or more application developers of a given enterprise. In one example, the cloud computing platform services comprise PaaS platform services and support tools.

20 Claims, 6 Drawing Sheets

(51) Int. Cl.
*H04L 29/06* (2006.01)
*H04L 29/08* (2006.01)

(58) Field of Classification Search
CPC ..... H04W 12/12; H04W 28/24; H04W 4/025; H04W 4/33; H04W 76/11; H04W 76/12; H04W 92/02
See application file for complete search history.

(56) References Cited

U.S. PATENT DOCUMENTS

| | | | |
|---|---|---|---|
| 2012/0110572 A1* | 5/2012 | Kodi | G06F 9/45558 718/1 |
| 2013/0211559 A1* | 8/2013 | Lawson | G06Q 10/06315 700/83 |
| 2014/0006616 A1* | 1/2014 | Aad et al. | G06F 15/173 709/225 |
| 2014/0032764 A1* | 1/2014 | Akolkar | G06F 9/5072 709/226 |
| 2016/0124742 A1* | 5/2016 | Rangasamy | H04L 47/70 |
| 2016/0147529 A1* | 5/2016 | Coleman | G06F 8/63 717/120 |
| 2016/0275287 A1* | 9/2016 | Wiest | G06F 9/455 |
| 2017/0006135 A1* | 1/2017 | Siebel | H04L 67/02 |
| 2017/0041296 A1* | 2/2017 | Ford | H04L 29/06 |
| 2017/0351514 A1* | 12/2017 | Chou | G06F 3/04842 |
| 2018/0136931 A1* | 5/2018 | Hendrich | G06F 11/302 |
| 2018/0316772 A1* | 11/2018 | Eberlein | H04L 67/32 |
| 2018/0322558 A1* | 11/2018 | Padmanabh | G06Q 30/0623 |
| 2019/0265971 A1* | 8/2019 | Behzadi | G06F 8/10 |
| 2019/0349421 A1* | 11/2019 | Schincariol | G06F 9/5072 |

\* cited by examiner

CLOUD COMPUTING PLATFORM SERVICE MANAGEMENT

FIELD

The field relates generally to cloud computing environments, and more particularly to techniques for providing improved management of cloud computing platform services in such cloud computing environments.

BACKGROUND

It is well understood that efficient software program (e.g., application program or simply "application") development and effective deployment of such applications in cloud computing environments are important processes for an enterprise to maintain advantages over its competitors. To achieve such advantages, an enterprise may typically utilize a Platform-as-a-Service (PaaS) platform to develop and deploy their applications in a cloud computing environment. A PaaS platform is a cloud computing-based platform that provides users, typically via a third-party provider, with software and hardware infrastructure that enable the users to develop, deploy and update their applications. For example, Dell® IT Cloud Foundry is a PaaS platform offering that, along with other PaaS support service and tool offerings (some privately available within an enterprise and others publicly available through third-party providers), enable users to manage their applications through the lifecycles of their applications.

However, within a given enterprise, there are typically procedures in place for application development teams to follow when developing, deploying and/or updating their applications. By way of example only, application developers may have to reach out to information technology (IT) administrators for any PaaS platform, support service, or tool configuration requests. There may be a lengthy process for each request, e.g.: (i) open one or more tickets for any access requests; (ii) follow up on prioritized tickets; (iii) close tickets; and (iv) if the fulfillment is not done properly, then reopen or submit a new ticket. This process results in a labor and routine task intensive experience for managing a PaaS platform. As such, it is likely that configuration or administrative errors will be made and parallel requests by development team members will be backlogged, resulting in extra cost and/or loss of competitive opportunities for a given enterprise. As such, improved cloud computing platform (e.g., PaaS) service management techniques are needed.

SUMMARY

Embodiments of the invention provide techniques for improved management of cloud computing platform services in cloud computing environments.

For example, in one illustrative embodiment, a system comprises one or more processors operatively coupled to one or more memories to form a cloud computing platform services management framework, wherein the cloud computing platform services management framework is configured to perform steps of: providing one or more graphical user interfaces; and enabling centralized self-service access to a plurality of cloud computing platform services through the one or more graphical user interfaces for one or more application developers of a given enterprise. Illustrative embodiments include systems, methods and articles of manufacture that are configured to provide processing modules and steps that enable the above and other features.

Advantageously, illustrative embodiments provide a management platform that provides efficient application development and effective deployment of such applications in cloud computing environments in order to enable a given enterprise to maintain advantages over its competitors. While not limited thereto, illustrative embodiments are particularly well suited for self-service management of PaaS services and tools.

These and other features and advantages of the invention will become more readily apparent from the accompanying drawings and the following description.

DETAILED DESCRIPTION

Illustrative embodiments will be described herein with reference to exemplary information processing systems and associated host devices, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual computing resources. An information processing system may therefore comprise, for example, a cloud infrastructure hosting multiple tenants that share cloud computing resources. Such systems are considered examples of what are more generally referred to herein as "computing network environments." Environments that implement multiple cloud platforms are referred to as multi-cloud computing environments. As mentioned above, a multi-cloud computing environment employed by an enterprise may comprise a combination of private and public clouds. The term "enterprise" as used herein is intended to be broadly construed, and may comprise, for example, one or more businesses, one or more corporations or any other one or more entities, groups, or organizations. An "entity" as illustratively used herein may be a person or system.

As will be further explained herein, illustrative embodiments provide a self-service environment that provides application developers with a common management portal for administrating PaaS platforms, support services and tools (collectively representing examples of "cloud computing platform services"). More particularly, illustrative embodiments bring all PaaS offerings under one management platform within a PaaS environment and thereby provide access to application development team members to self-manage their requests. Such a management platform, in illustrative embodiments, enables application development team members to fulfill their requests on their own by having administrative access (that can be selectively limited by an administrator) to common PaaS services and tools. In illustrative embodiments, the limited administrative access may also include auditing features to comply with regulations and common practices.

Examples of PaaS self-service features in such a management platform according to illustrative embodiments include, but are not limited to: (i) managing PaaS platform users across all PaaS instances; (ii) tools to self-enable effective application development collaboration; (iii) source code system management; and (iv) application programming interface (API) management, e.g., layer 7 features and functions management.

Figure 1:
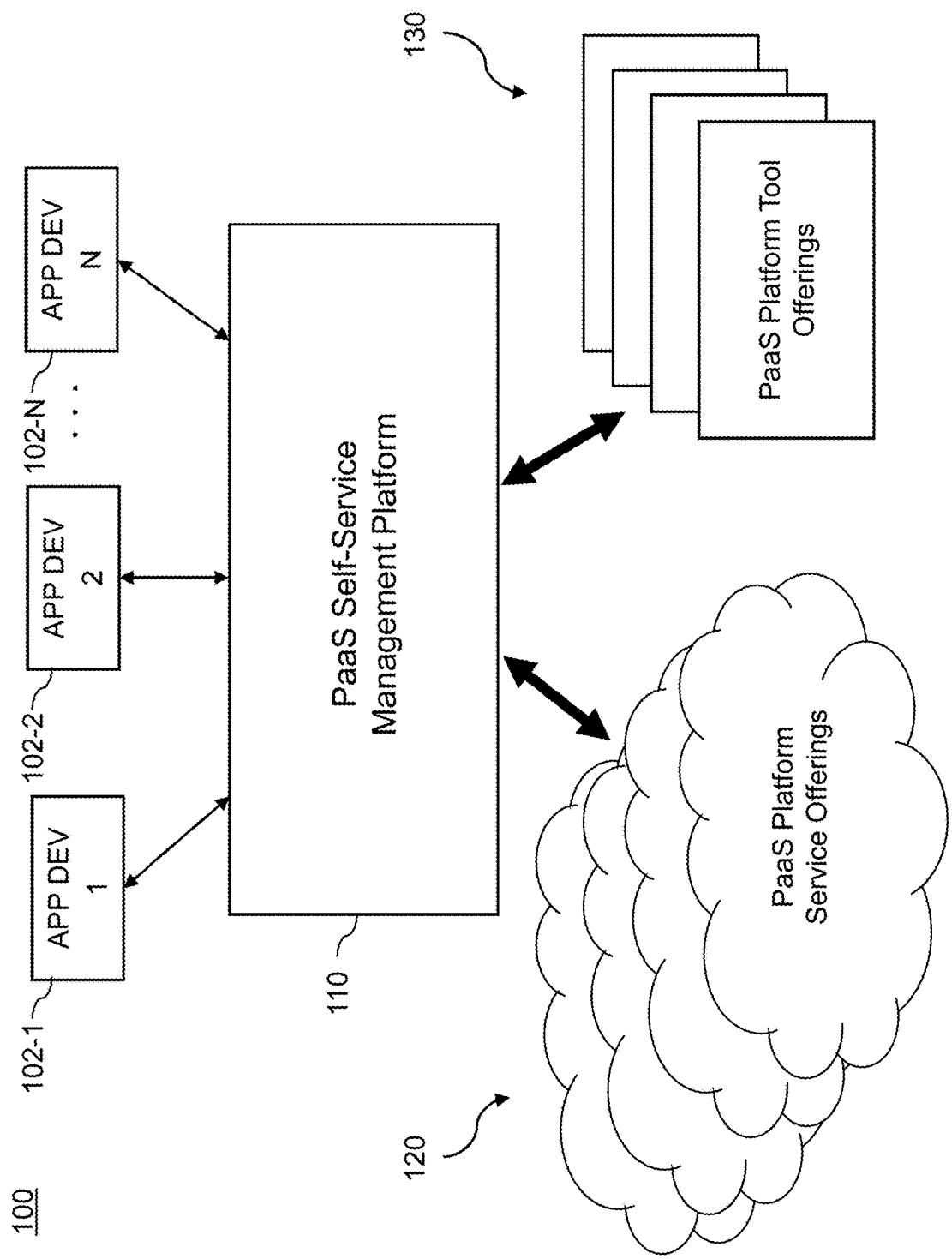
FIG. 1 illustrates an information processing system implementing a cloud computing platform services management framework, according to an illustrative embodiment.

FIG. 1 illustrates an information processing system 100 implementing a cloud computing platform services management framework, according to an illustrative embodiment. As shown in information processing system 100, a plurality of application developers (APP DEV 1, APP DEV 2, ... APP DEV N) 102-1, 102-2, ... 102-N are operatively coupled (e.g., via their respective computing devices) to a PaaS self-service management platform 110. The PaaS self-service management platform 100 provides centralized self-service access for the application developers 102-1, 102-2, ... 102-N to a plurality of cloud computing platform services through one or more graphical user interfaces. The cloud computing platform services are illustratively shown as PaaS platform service offerings 120 and PaaS platform tool offerings 130, which are operatively coupled to PaaS self-service management platform 110.

Figure 2:
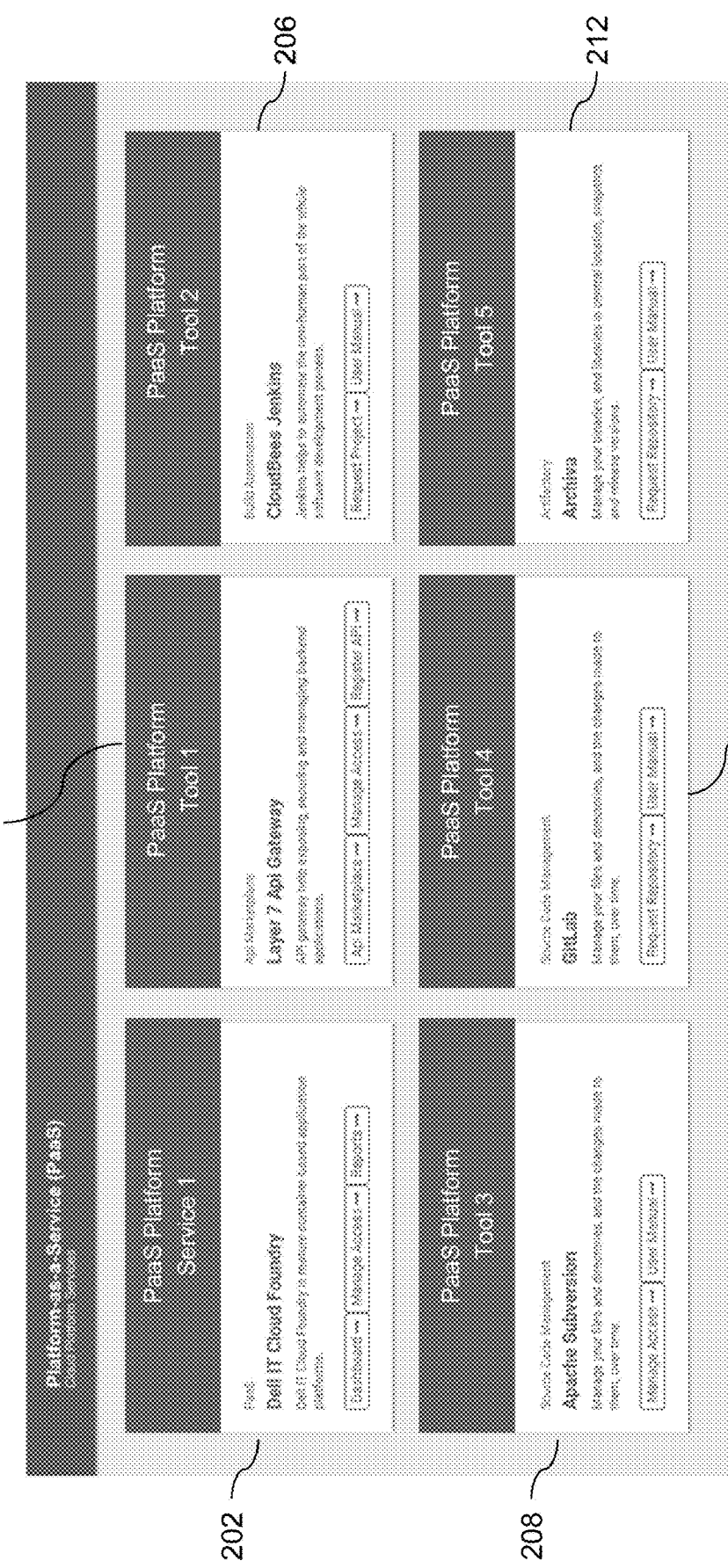
FIG. 2 illustrates a first self-service graphical user interface associated with a cloud computing platform services management framework, according to an illustrative embodiment.

FIG. 2 illustrates a first self-service graphical user interface associated with a cloud computing platform services management framework, according to an illustrative embodiment. More particularly, as shown, a self-service graphical user interface (GUI) 200 is generated by PaaS self-service management platform 110 and presented to one or more of the application developers 102-1, 102-2, ... 102-N automatically or upon request. In illustrative embodiments, the GUI 200 is generated and presented across a communication network that operatively connects the computing devices of the application developers with the management platform 110. For example, a given application developer can access the management platform 110, which then displays the GUI 200 to the given application developer.

GUI 200 illustrates a plurality of cloud computing platform services that are made available to the application developers (APP DEV 1, APP DEV 2, ... APP DEV N) 102-1, 102-2, ... 102-N. More particularly, each of the GUI features 202, 204, 206, 208, 210 and 212 that are part of GUI 200 respectively correspond to a cloud computing platform service the application developer can access using one or more input devices (e.g., mouse or trackpad controllable on-screen cursor) to select one or more sub-features of each service (e.g., manage access, make requests, access user manual, etc.). Upon selection via a GUI feature or sub-feature, the particular operation associated with the selection is initiated and/or otherwise executed.

It is to be appreciated that the specific services that are illustrated as part of GUI 200 are merely examples of PaaS platform service offerings 120 (e.g., 202) and PaaS platform tool offerings 130 (e.g., 204, 206, 208, 210 and 212) that are made available in a centralized self-service manner to the application developers 102-1, 102-2, ... 102-N. Thus, by way of example only, GUI 200 presents the given application developer with access to Dell® IT Cloud Foundry (feature 202 or PaaS Platform Service 1), API Gateway® (feature 204 or PaaS Platform Tool 1), CloudBees Jenkins® (feature 206 or PaaS Platform Tool 2), Apache Subversion® (feature 208 or PaaS Platform Tool 3), GitLab® (feature 210 or PaaS Platform Tool 4) and Archiva® (feature 212 or PaaS Platform Tool 5). It is to be understood that, in alternative embodiments, more, less, and/or different cloud computing platform services can be part of GUI 200 and/or one or more other similar GUIs generated and presented by the PaaS self-service management platform 110.

Dell® IT Cloud Foundry (feature 202 or PaaS Platform Service 1) is a PaaS platform service that enables users to manage their container-based applications. Selectable sub-features available to the application developers for this service include, as shown, display a Cloud Foundry-specific dashboard (GUI), manage access to the Cloud Foundry PaaS platform, and obtain Cloud Foundry reports associated with development and deployment of given applications.

API Gateway® (feature 204 or PaaS Platform Tool 1) is a PaaS platform service that enables users to expose, secure and manage back-end applications through available application programming interfaces (APIs). Selectable sub-features available to the application developers for this service include, as shown, an API marketplace for selecting available APIs, registering APIs, and managing access to the APIs.

CloudBees Jenkins® (feature 206 or PaaS Platform Tool 2) is a PaaS platform service that enables automation for users to develop software applications. Selectable sub-features available to the application developers for this service include, as shown, a project request, and user manual access.

Apache Subversion® (feature 208 or PaaS Platform Tool 3) is a PaaS platform service that enables users to manage source code including files and directories as well as changes associated therewith. Selectable sub-features available to the application developers for this service include, as shown, access management, and user manual access.

GitLab® (feature 210 or PaaS Platform Tool 4) is a PaaS platform service that enables users to manage source code including files and directories as well as changes associated therewith. Selectable sub-features available to the application developers for this service include, as shown, repository request, and user manual access.

Archiva® (feature 212 or PaaS Platform Tool 5) is a PaaS platform service that enables users to manage binaries, and libraries in a central location, as well as snapshot and release versions. Selectable sub-features available to the application developers for this service include, as shown, repository request, and user manual access.

As mentioned above, the features and sub-features shown in GUI 200 are intended to be non-limiting examples of services that are available to application developers in a centralized self-service management platform (e.g., management platform 110).

Figure 3:
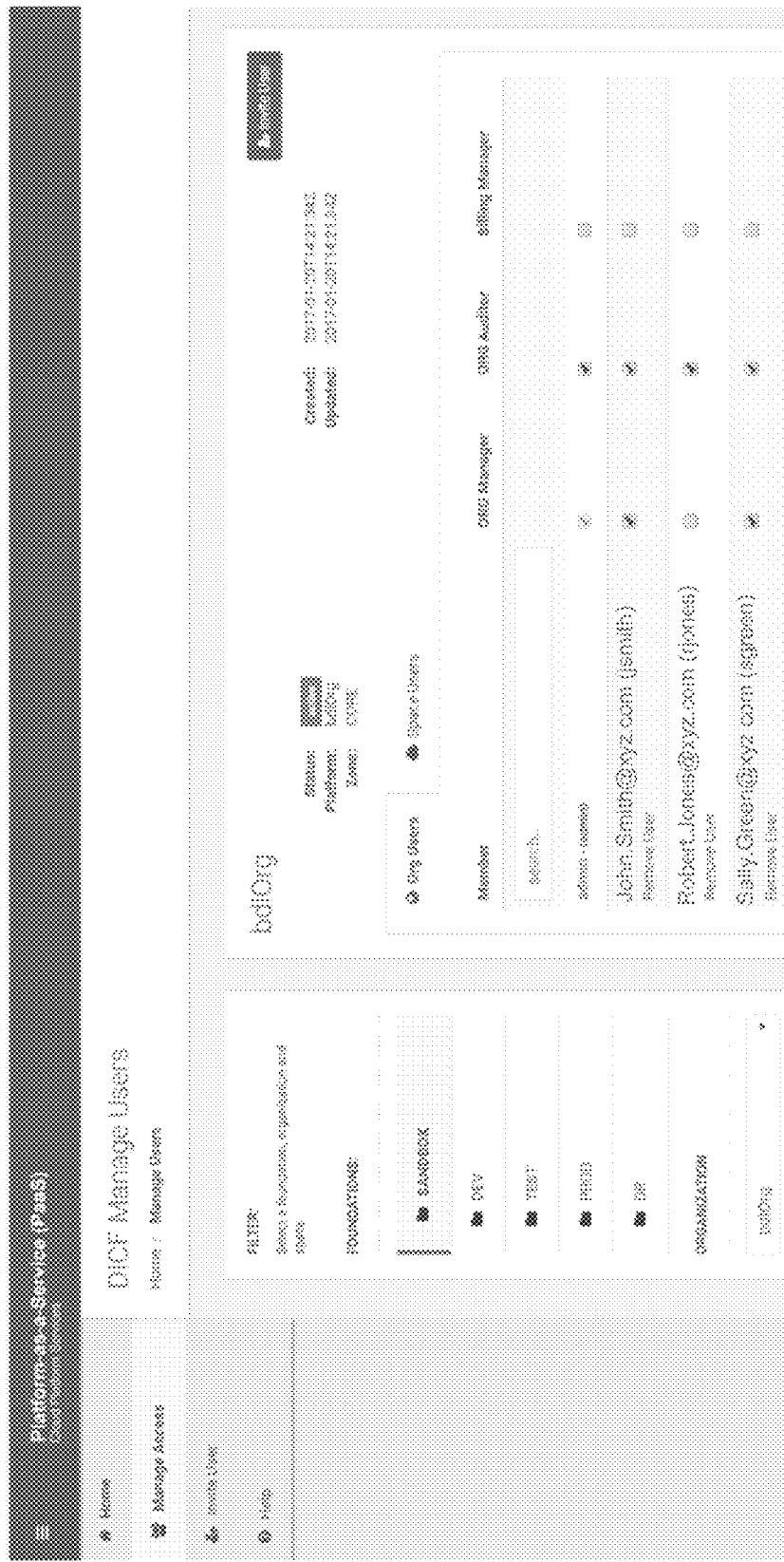
FIG. 3 illustrates a second self-service graphical user interface associated with a cloud computing platform services management framework, according to an illustrative embodiment.

FIG. 3 illustrates a second self-service graphical user interface associated with a cloud computing platform services management framework, according to an illustrative embodiment.

Interface 300 is a user management control interface for the PaaS self-service management platform 110 which allows a given application development team to control who has access to their cloud computing environment. Development leads can set up new users within a matter of minutes, and adjust user access as necessary. New users will receive a welcome email, outlining everything they need to get started. In one or more illustrative embodiments, authentication is tied into corporate (enterprise) Lightweight Directory Access Protocol (LDAP) so users can use the same credentials (e.g., Windows NT) they use to log into their local system (computing device) to access their cloud platform.

When an application team comes on board to the PaaS self-service management platform 110, they have several different environments they need to manage. To be in-line with Software Development Life Cycle (SDLC) best practices, the team will have a development, test, and production environment, as well as additional environments in a screened subnet (also known as the demilitarized zone or DMZ) if they have web applications that need to be accessed externally (outside of the enterprise network e.g., outside the private cloud). Each of these are separate platforms with separate logins. Prior to the introduction of the self-service portal provided by management platform 110, the development leads would need to log into each environment separately to manage user access. This was a very cumbersome process. To set up one user, the development lead could potentially need to log into six separate uniform resource locators (URLs). The self-service portal provided by management platform 110 allows for administering all environments in one place. Also, NT credentials would not work to log into the cloud platform prior to this solution, and an emailed welcome packet was not available.

For example, in the non-limiting example shown in FIG. 3, in a Dell® IT Cloud Foundry Manage Users screen, an administrator (admin) can grant, deny, and remove access to different users (e.g., John Smith, Robert Jones, Sally Green, etc.) all in the same management graphical user interface.

Figure 4:
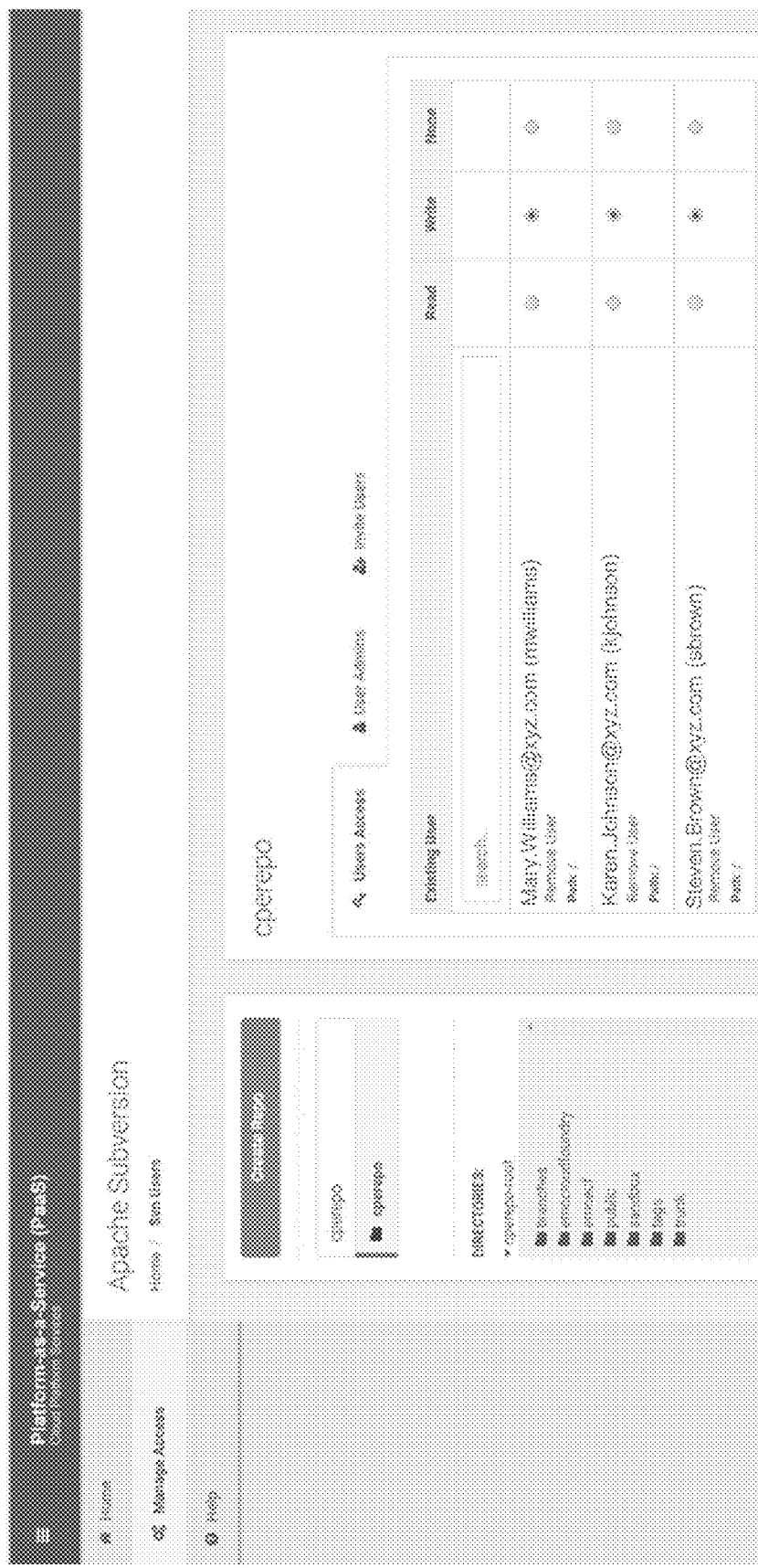
FIG. 4 illustrates a third self-service graphical user interface associated with a cloud computing platform services management framework, according to an illustrative embodiment.

FIG. 4 illustrates a third self-service graphical user interface associated with a cloud computing platform services management framework, according to an illustrative embodiment.

Interface 400 is a self-service control interface for the PaaS self-service management platform 110 which is tailored for the Apache Subversion® tool (e.g., feature 208 or PaaS Platform Tool 3). Recall that the Apache Subversion® tool (also referred to as SVN) is a PaaS platform service that enables users to manage source code including files and directories as well as changes associated therewith. That is, SVN is a repository for developers to keep their software code. Code repositories are necessary as they provide proper backup of the software code, sharing of software code, tracking of changes, and version control. The self-service portals provided by the PaaS self-service management platform 110, e.g., interface 400, allows developers to manage their own SVN repository. This is a great advantage to both the application team and the platform team. Prior to this functionality, the application team had to rely on the platform team for user access changes (e.g., using the ticket process mentioned above in the background section). The platform team used to get many service now requests to grant or change SVN access. The existing process put a strain on platform resources, and also application teams would lose development time as they waited for users to be set up, or have access to a certain piece of software code.

Advantageously, functionality available through interface 400 includes, but is not limited to:

(i) A person on the development team can be set up as a user administrator (user admin);

(ii) Only user admins can control user access on this interface;

(iii) On the interface, the user admin can also set up other user admins as back up, or to help manage;

(iv) User admins are able to invite new users to the SVN repository;

(v) The repository has a directory structure, and the user admin can specifically control exactly what directories a user has access to, and the type of access they have;

(vi) User admin can change access from read, write, or none;

(vii) An audit is kept on user access changes; and (viii) An email is sent letting the user know their set up is complete, and how to access their repository.

Advantageously, the above-described interfaces (200, 300 and 400) enable an enterprise to overcome above-mentioned problems for application developers with respect to working with PaaS services and tools. Application development teams can use interfaces 200, 300 and 400 to realize (over existing approaches) higher performance, less maintenance, improved security, and improved compliance. These self-service interfaces can help an application development team go-live within weeks instead of months by getting enabling them to start immediate proof-of-concept (POC) and then go live with the new or updated application in a much shorter timeframe than possible with existing approaches. Furthermore, with these interfaces, the application development team can request a trial organization (org) to host the application during development and test phase, and finally move to the production stage without hassles and lengthy manual steps such as creating tickets. As is known, a trial or test org is an environment or event for testing out an application, or parts thereof, that the application developer is currently developing.

Figure 5:
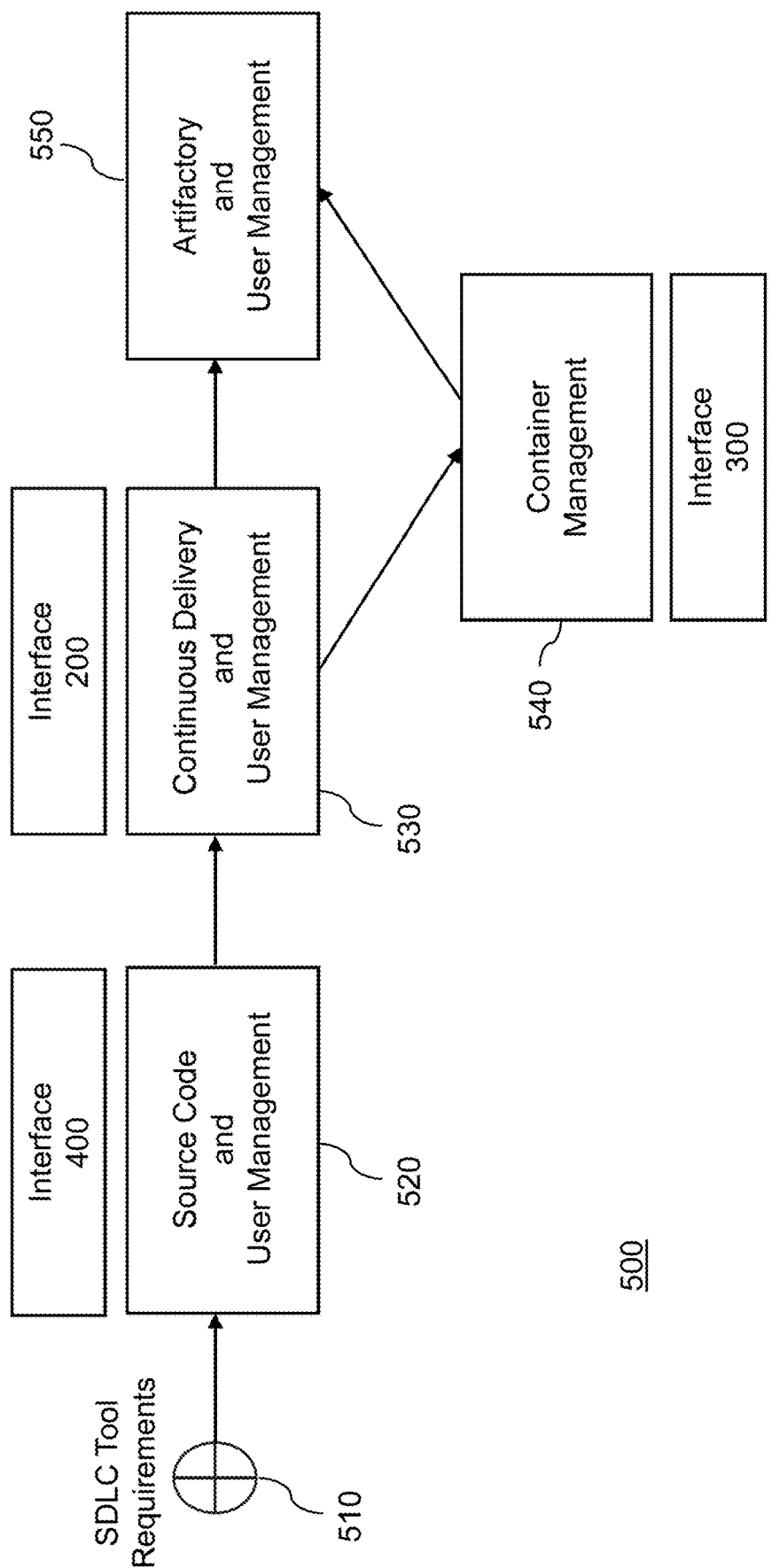
FIG. 5 illustrates software development process associated with a cloud computing platform services management framework, according to an illustrative embodiment.

FIG. 5 is a flow diagram of a software development process 500 using various services/tools along with interfaces 200, 300 and 400 of the PaaS self-service management platform 110. As shown, the process 500 receives as input one or more SDLC tool requirements 510. In one example, the requirements may comprise one or more source code management requirements, one or more continuous integration and continuous deployment (CICD) management requirements, and one or more artifactory management requirements. The process 500 comprises: a source code and user management phase 520 accessible via interface 400 (FIG. 4); a continuous delivery and user management phase 530 accessible via interface 200 (FIG. 2); a container management phase 540 accessible via interface 300 (FIG. 3); and an artifactory and user management phase 550.

The container management phase 540 provides a platform for hosting applications through interface 300, e.g., Dell® IT Cloud Foundry (feature 202 or PaaS Platform Service 1). The source code management phase 520 provides a tool to store the code base utilizing interface 400. The continuous delivery phase 530 provides automation for users to develop software applications through interface 200, e.g., CloudBees Jenkins® (feature 206 or PaaS Platform Tool 2). The artifactory phase 550 provides a repository to store product artifacts, e.g., Archiva® (feature 212 or PaaS Platform Tool 5). Billing information and usability is provided by interface 200.

Accordingly, using interface 300, a given application development team requests a trial org and later a production grade (i.e., development, test and production). The required org is obtained within minutes instead of days (as in existing approaches).

Once POC has been completed and stakeholders (those with an interest in the application development) have approved the POC, the application development team uses interface 400 and the requested source code management tool (GitLab and/or SVN) so that they can start real development. In order to implement continuous delivery, they can utilize CloudBees Jenkins® (feature 206 or PaaS Platform Tool 2) and store the artifacts they need to have in a repository using Archiva® (feature 212 or PaaS Platform Tool 5). Interface 200 enables the application team members to access Jenkins® and Archiva®.

Additional operations that are enabled through one or more interfaces of the PaaS self-service management platform 110 include, but are not limited to:

(i) Managing User Access, inviting a user to an org, modifying/updating the roles of users;

(ii) Creating a project space in SVN to manage code, and later managing the user access;

(iii) Requesting and acquiring a space in a build system environment to configure the build, deploy a job, and manage user's access;

(iv) Requesting and acquiring a space in Artifactory to publish binaries, libraries, or jar/war; and (v) Exposing of an application programming interface (API) to external users to consume the application, using various authentication options.

At least portions of the cloud computing platform services management framework shown in FIGS. 1-5 may be implemented using one or more processing platforms associated with one or more information processing systems in a computing network environment. In some embodiments, a given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one. In many embodiments, logic may be executed across one or more physical or virtual processors. In certain embodiments, a virtual processor may be mapped to and executed on or across a portion of one or more virtual or physical processors. An illustrative embodiment of a processing platform will now be described in greater detail in conjunction with FIG. 6.

As is apparent from the above, one or more of the processing modules or other components of the cloud computing platform services management framework shown in FIGS. 1-4 may each run on a computer, server, storage device or other processing platform element. A given such element may be viewed as an example of what is more generally referred to herein as a "processing device." An example of such a processing platform is processing platform 600 shown in FIG. 6.

The processing platform 600 in this embodiment comprises a plurality of processing devices, denoted 602-1, 602-2, 602-3, . . . 602-N, which communicate with one another over a network 604.

The network 604 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

As mentioned previously, some networks utilized in a given embodiment may comprise high-speed local networks in which associated processing devices communicate with one another utilizing Peripheral Component Interconnect Express (PCIe) cards of those devices, and networking protocols such as InfiniBand, Gigabit Ethernet or Fibre Channel.

The processing device 602-1 in the processing platform 600 comprises a processor 610 coupled to a memory 612.

The processor 610 may comprise a microprocessor, a microcontroller, an application-specific integrated circuit (ASIC), a field-programmable gate array (FPGA) or other type of processing circuitry, as well as portions or combinations of such circuitry elements.

The memory 612 may comprise random access memory (RAM), read-only memory (ROM) or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered embodiments of the present disclosure. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Figure 6:
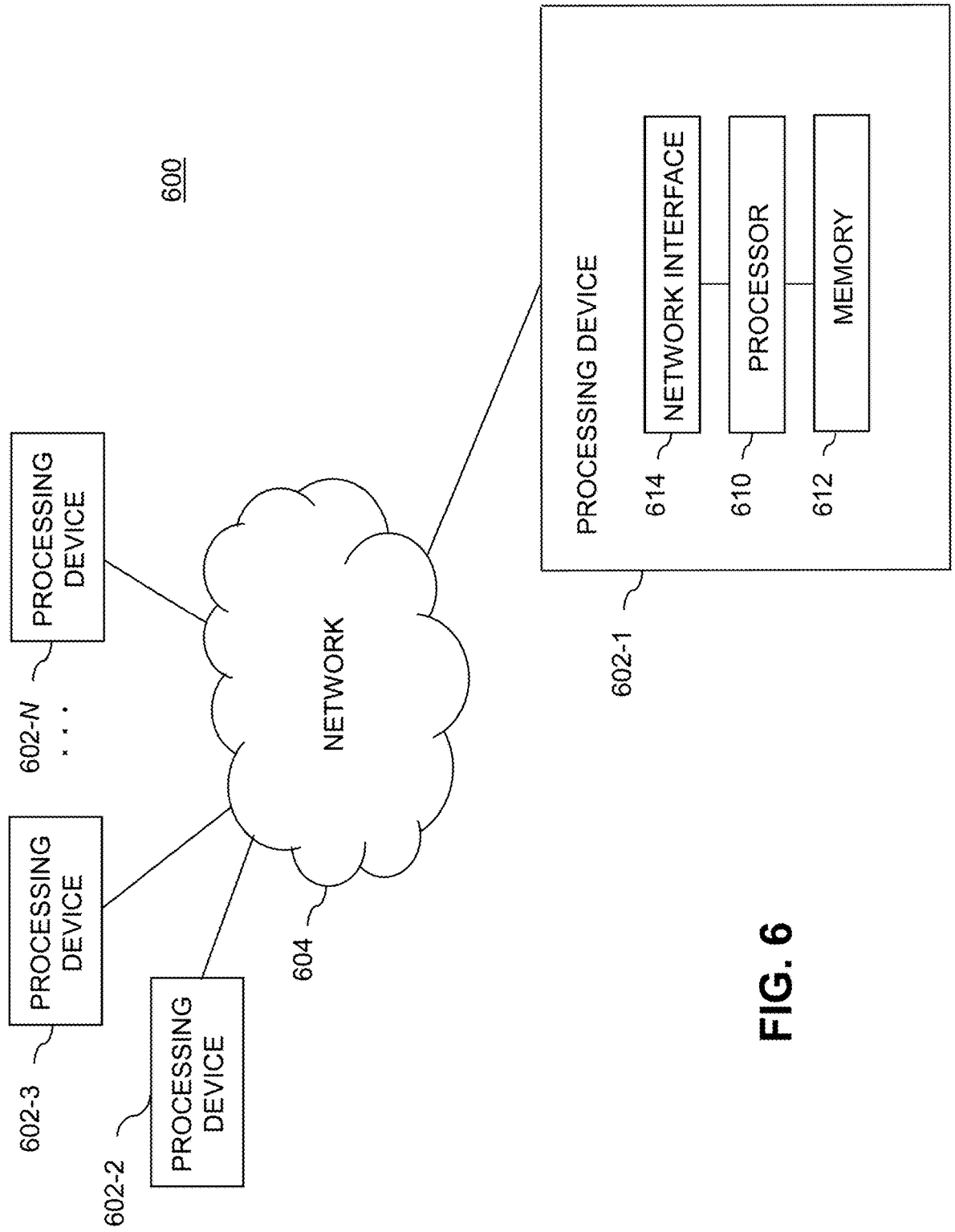
FIG. 6 illustrates a processing platform used to implement a cloud computing platform services management framework, according to an illustrative embodiment.

Also included in the processing device 602-1 of the example embodiment of FIG. 6 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, this particular processing platform is presented by way of example only, and other embodiments may include additional or alternative processing platforms, as well as numerous distinct processing platforms in any combination, with each such platform comprising one or more computers, servers, storage devices or other processing devices.

For example, other processing platforms used to implement embodiments of the disclosure can comprise different types of virtualization infrastructure, in place of or in addition to virtualization infrastructure comprising virtual machines. Such virtualization infrastructure illustratively includes container-based virtualization infrastructure configured to provide Docker containers or other types of Linux containers (LXCs).

The containers may be associated with respective tenants of a multi-tenant environment, although in other embodiments a given tenant can have multiple containers. The containers may be utilized to implement a variety of different types of functionality within the system. For example, containers can be used to implement respective cloud compute nodes or cloud storage nodes of a cloud computing and storage system. The compute nodes or storage nodes may be associated with respective cloud tenants of a multi-tenant environment. Containers may be used in combination with other virtualization infrastructure such as virtual machines implemented using a hypervisor.

As another example, portions of a given processing platform in some embodiments can comprise converged infrastructure such as VxRail™, VxRack™ or Vblock® converged infrastructure commercially available from VCE, the Virtual Computing Environment Company, now the Converged Platform and Solutions Division of Dell EMC. For example, portions of a system of the type disclosed herein can be implemented utilizing converged infrastructure.

It should therefore be understood that in other embodiments different arrangements of additional or alternative elements may be used. In many embodiments, at least a subset of these elements may be collectively implemented on a common processing platform, or each such element may be implemented on a separate processing platform.

Also, in other embodiments, numerous other arrangements of computers, servers, storage devices or other components are possible in the cloud computing platform services management framework. Such components can communicate with other elements of the system over any type of network or other communication media.

As indicated previously, in some embodiments, components of the cloud computing platform services management framework as disclosed herein can be implemented at least in part in the form of one or more software programs stored in memory and executed by a processor of a processing device. For example, at least portions of the execution environment or other system components are illustratively implemented in one or more embodiments the form of software running on a processing platform comprising one or more processing devices.

It should again be emphasized that the above-described embodiments of the disclosure are presented for purposes of illustration only. Many variations and other alternative embodiments may be used. For example, the disclosed techniques are applicable to a wide variety of other types of systems. Also, the particular configurations of system and device elements, associated processing operations and other functionality illustrated in the drawings can be varied in other embodiments. Moreover, the various assumptions made above in the course of describing the illustrative embodiments should also be viewed as exemplary rather than as requirements or limitations of the embodiments. Numerous other alternative embodiments within the scope of the appended claims will be readily apparent to those skilled in the art.

What is claimed is:

1. A method comprising:
    providing one or more graphical user interfaces; and
    enabling centralized self-service access to a plurality of cloud computing platform services through the one or more graphical user interfaces for a plurality of application developers of a given enterprise, wherein enabling comprises providing limited administrative access to the plurality of cloud computing platform services through the one or more graphical user interfaces to a given application developer to allow the given application developer to utilize one or more features of the plurality of cloud computing platform services independent of respective administrators of the plurality of cloud computing platform services and that would otherwise require generation of one or more requests for access to the one or more features by the given application developer, submission of the one or more requests to respective administrators of the plurality of cloud computing platform services, and fulfillment of the one or more requests by the respective administrators of the plurality of cloud computing platform services;
    wherein the cloud computing platform services are available through a single centralized self-service management platform to the plurality of application developers, the single centralized self-service management platform providing centralized self-services to the application developers to provide access to the plurality of cloud computing platform services;
        wherein the one or more graphical interfaces are generated by the single centralized self-service management platform upon access thereof by the application developers; and
    wherein the steps are performed by one or more processors operatively coupled to one or more memories.

2. The method of claim 1, wherein the cloud computing platform services comprise one or more Platform-as-a-Service related support tools.

3. The method of claim 1, wherein the one or more graphical user interfaces are configured to receive one or more cloud computing platform service requests from at least one application developer.

4. The method of claim 1, wherein the one or more graphical user interfaces are configured to enable management of cloud computing platform users across one or more instances.

5. The method of claim 1, wherein the one or more graphical user interfaces are configured to enable management of tools for application development collaboration.

6. The method of claim 1, wherein the one or more graphical user interfaces are configured to enable source code management.

7. The method of claim 1, wherein the one or more graphical user interfaces are configured to enable management of application programming interface functions.

8. The method of claim 1, wherein the one or more graphical user interfaces are configured to enable an administrator to control access by users to the plurality of cloud computing platform services.

9. A system comprising:
    one or more memories; and
    one or more processors operatively coupled to the one or more memories to form a cloud computing platform services management framework, wherein the cloud computing platform services management framework is configured to perform steps of:
    providing one or more graphical user interfaces; and
        enabling centralized self-service access to a plurality of cloud computing platform services through the one or more graphical user interfaces for a plurality of application developers of a given enterprise, wherein enabling comprises providing limited administrative access to the plurality of cloud computing platform services through the one or more graphical user interfaces to a given application developer to allow the given application developer to utilize one or more features of the plurality of cloud computing platform services independent of respective administrators of the plurality of cloud computing platform services and that would otherwise require generation of one or more requests for access to the one or more features by the given application developer, submission of the one or more requests to respective administrators of the plurality of cloud computing platform services, and fulfillment of the one or more requests by the respective administrators of the plurality of cloud computing platform services;

wherein the cloud computing platform services are available through a single centralized PaaS self-service management platform to the plurality of application developers, the single centralized self-service management platform providing centralized self-services to the application developers to provide access to the plurality of cloud computing platform services; and wherein the one or more graphical interfaces are generated by the single centralized self-service management platform upon access thereof by the application developers.

10. The system of claim 9, wherein the cloud computing platform services comprise one or more Platform-as-a-Service related support tools.

11. The system of claim 9, wherein the one or more graphical user interfaces are configured to receive one or more cloud computing platform service requests from at least one application developer.

12. The system of claim 9, wherein the one or more graphical user interfaces are configured to enable management of cloud computing platform users across one or more instances.

13. The system of claim 9, wherein the one or more graphical user interfaces are configured to enable management of tools for application development collaboration.

14. The system of claim 9, wherein the one or more graphical user interfaces are configured to enable source code management.

15. The system of claim 9, wherein the one or more graphical user interfaces are configured to enable management of application programming interface functions.

16. The system of claim 9, wherein the one or more graphical user interfaces are configured to enable an administrator to control access by users to the plurality of cloud computing platform services.

17. The system of claim 9, wherein the one or more graphical user interfaces are configured to enable an administrator to control access by users to individual features of a given one of the plurality of cloud computing platform services.

18. An article of manufacture comprising a non-transitory processor-readable storage medium having stored therein program code of one or more software programs, wherein the program code when executed by at least one processing device causes said at least one processing device to perform steps of:

providing one or more graphical user interfaces; and enabling centralized self-service access to a plurality of cloud computing platform services through the one or more graphical user interfaces for a plurality of application developers of a given enterprise, wherein enabling comprises providing limited administrative access to the plurality of cloud computing platform services through the one or more graphical user interfaces to a given application developer to allow the given application developer to utilize one or more features of the plurality of cloud computing platform services independent of respective administrators of the plurality of cloud computing platform services and that would otherwise require generation of one or more requests for access to the one or more features by the given application developer, submission of the one or more requests to respective administrators of the plurality of cloud computing platform services, and fulfillment of the one or more requests by the respective administrators of the plurality of cloud computing platform services;

wherein the cloud computing platform services are available through a single centralized self-service management platform to the plurality of application developers, the single centralized self-service management platform providing centralized self-services to the application developers to provide access to the plurality of cloud computing platform services; and wherein the one or more graphical interfaces are generated by the single centralized self-service management platform upon access thereof by the application developers.

19. The article of claim 18, wherein the cloud computing platform services comprise one or more Platform-as-a-Service related support tools.

20. The article of claim 18, wherein the one or more graphical user interfaces are configured to receive one or more cloud computing platform service requests from at least one application developer.

* * * * *